United States Patent
Itoh et al.

(10) Patent No.: US 8,319,370 B2
(45) Date of Patent: Nov. 27, 2012

(54) GRID INTERCONNECTION DEVICE AND POWER CONTROL SYSTEM

(75) Inventors: Kazuo Itoh, Osaka (JP); Masahiro Makino, Osaka (JP); Toshiyuki Hirata, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 331 days.

(21) Appl. No.: 12/713,949

(22) Filed: Feb. 26, 2010

(65) Prior Publication Data

US 2010/0213762 A1 Aug. 26, 2010

(30) Foreign Application Priority Data

Feb. 26, 2009 (JP) ................. 2009-044452

(51) Int. Cl.
*H02J 1/12* (2006.01)
*G05D 3/12* (2006.01)

(52) U.S. Cl. .......................... 307/21; 700/295

(58) Field of Classification Search .............. 307/18, 307/19, 20, 21; 700/295
See application file for complete search history.

(56) References Cited

U.S. PATENT DOCUMENTS 6,861,956 B2 * 3/2005 Ying .................... 340/12.52
8,008,804 B2 * 8/2011 Capp et al. .................. 307/44

FOREIGN PATENT DOCUMENTS

JP 2006180660 7/2006

* cited by examiner

*Primary Examiner* — Michael Rutland Wallis
(74) *Attorney, Agent, or Firm* — NDQ&M Watchstone LLP

(57) ABSTRACT

A grid interconnection device 100 comprises a receiver configured to receive an adjustment instruction and a controller configured to control a backward flow power on the basis of the adjustment instruction. The adjustment instruction includes group information indicating an application group to which the adjustment instruction is applied among a plurality of groups G. Customers 30 (each includes a power supply device) are grouped depending on the distance from a substation.

4 Claims, 9 Drawing Sheets

[CURRENT INSTRUCTION] CHARGE          1kwh
[NEXT INSTRUCTION]    DISCHARGE       1kwh
[CURRENT INSTRUCTION] BACKWARD FLOW APPROVAL
[NEXT INSTRUCTION]    FORWARD FLOW RECEIVE REQUEST
REMAINING TIME UNTIL NEXT INSTRUCTION
OPERATING CONDITIONS
    PURCHASED ELECTRICITY: 2kwh
    SOLD ELECTRICITY : 0kwh
    RESTRICTION ON POWER SUPPLY : NO

GRID INTERCONNECTION DEVICE AND POWER CONTROL SYSTEM

CROSS REFERENCE TO RELATED APPLICATIONS

This application is based upon and claims the benefit of priority from prior Japanese Patent Application No. 2009-044452, filed on Feb. 26, 2009; the entire contents of which are incorporated herein by reference.

BACKGROUND OF THE INVENTION

1. Field of the Invention

The present invention relates to a grid interconnection device and a power control system configured to control a backward flow toward a power distribution system.

2. Description of the Related Art

Nowadays, there have been increasing cases where a power supply device is provided in a customer (for example, a house and a factory) supplied with alternating current power from a substation. The power supply device is, for example, a photovoltaic power generator, a fuel cell power generator, or a secondary battery, and is connected to a power distribution system under the management of the substation through a grid interconnection device. Output power outputted by the power supply device is not only consumed by a power consumption device provided in the customer itself but also may be reversely supplied toward the power distribution system through a grid interconnection point between the grid interconnection device and the power distribution system.

However, if a backward flow from the customer to the power distribution system increases, the voltage of the power distribution system might exceed the upper limit of a voltage management range. In this case, the grid interconnection device in each customer alternately performs power system separation processing to disconnect the connection between the power supply device and the power distribution system, and interconnection processing to connect the power supply device and the power distribution system. For this reason, an excessive load is imposed on the grid interconnection device, and a situation in which a backward flow is not allowed frequently occurs.

To cope with this, proposed is a grid interconnection device provided to a customer and having a function of detecting a backward flow from another customer adjacent to the customer (see Japanese Patent Application Publication No. 2006-180660). The grid interconnection devices of the respective customers adjacent to one another simultaneously perform the power system separation processing and the interconnection processing, and thereby can prevent the voltage of the power distribution system from exceeding the upper limit of the voltage management range.

SUMMARY OF THE INVENTION

When power flows reversely from each customer, the voltage at the grid interconnection point tends to be higher as the position of the grid interconnection point is farther from the substation. Therefore, as the position of the grid interconnection point is farther from the substation, the grid interconnection device performs the power system separation processing and the interconnection processing more frequently. This reduces opportunity for a backward flow, and thereby causes an unfair situation for part of the customers in the same power distribution system.

The present invention has been made to solve the aforementioned problem, and an object of the present invention is to provide a grid interconnection device and a power control system that allow each customer to provide backward flow of power equally.

A grid interconnection device according to the characteristic of the present invention is a grid interconnection device connected to a power distribution system electrically connecting a power distribution facility to a plurality of power supply devices, and connected to one of the plurality of power supply devices, the grid interconnection device configured to control backward flow power that is reversely provided from the one power supply device to the power distribution system. The grid interconnection device comprises: a receiver configured to receive an adjustment instruction that is transmitted through a predetermined transmission path and that is an instruction to adjust the backward flow power; and a controller configured to control the backward flow power on the basis of the adjustment instruction, wherein the adjustment instruction includes group information indicating an application group to which the adjustment instruction is applied among a plurality of groups formed by grouping the plurality of power supply devices depending on the distance from the power distribution facility, and the controller controls the backward flow power on the basis of the adjustment instruction when an own group is designated as the application group by the group information.

A power control system according to the characteristic of the present invention comprises: a power distribution facility configured to distribute alternating current power to a power distribution system; and a plurality of customers each including a power supply device and a grid interconnection device configured to control backward flow power that is reversely provided from the power supply device to the power distribution system, wherein the power distribution facility comprises: an instruction generator configured to generate an adjustment instruction that is an instruction to adjust the backward flow power; and a transmitter configured to transmit the adjustment instruction through a predetermined transmission path, the plurality of customers are grouped into a plurality of groups depending on the distance from the power distribution facility, and the grid interconnection device comprises: a receiver configured to receive the adjustment instruction through the predetermined transmission path; a determination unit configured to determine whether or not an own group to which its customer belongs to is designated as an application group to which the adjustment instruction is applied among the plurality of groups, on the basis of group information included in the adjustment instruction and indicating the application group; and a controller configured to control the backward flow power on the basis of the adjustment instruction when the determination unit determines that the own group is designated as the application group.

In the power control system according to the characteristic of the present invention, the group information may indicate that the application group is a first group in the plurality of groups including the first group and a second group.

In the power control system according to the characteristic of the present invention, each of the plurality of groups may comprise at least one customer provided with a power storage device as the power supply device.

In the power control system according to the characteristic of the present invention, the plurality of groups may include a first group and a second group having a smaller power storage capacity than the first group, and in response to the adjustment instruction, the second group may be allowed to provide the backward flow power for a longer time period than the first group.

In the power control system according to the characteristic of the present invention, the plurality of groups may include a first group and a second group having a smaller power storage capacity than the first group, and the first group may be closer to the power distribution facility than the second group.

According to the present invention, the grid interconnection device and the power control system that allow each customer to provide backward flow of power equally can be provided.

DETAILED DESCRIPTION OF THE INVENTION

Figure 1:
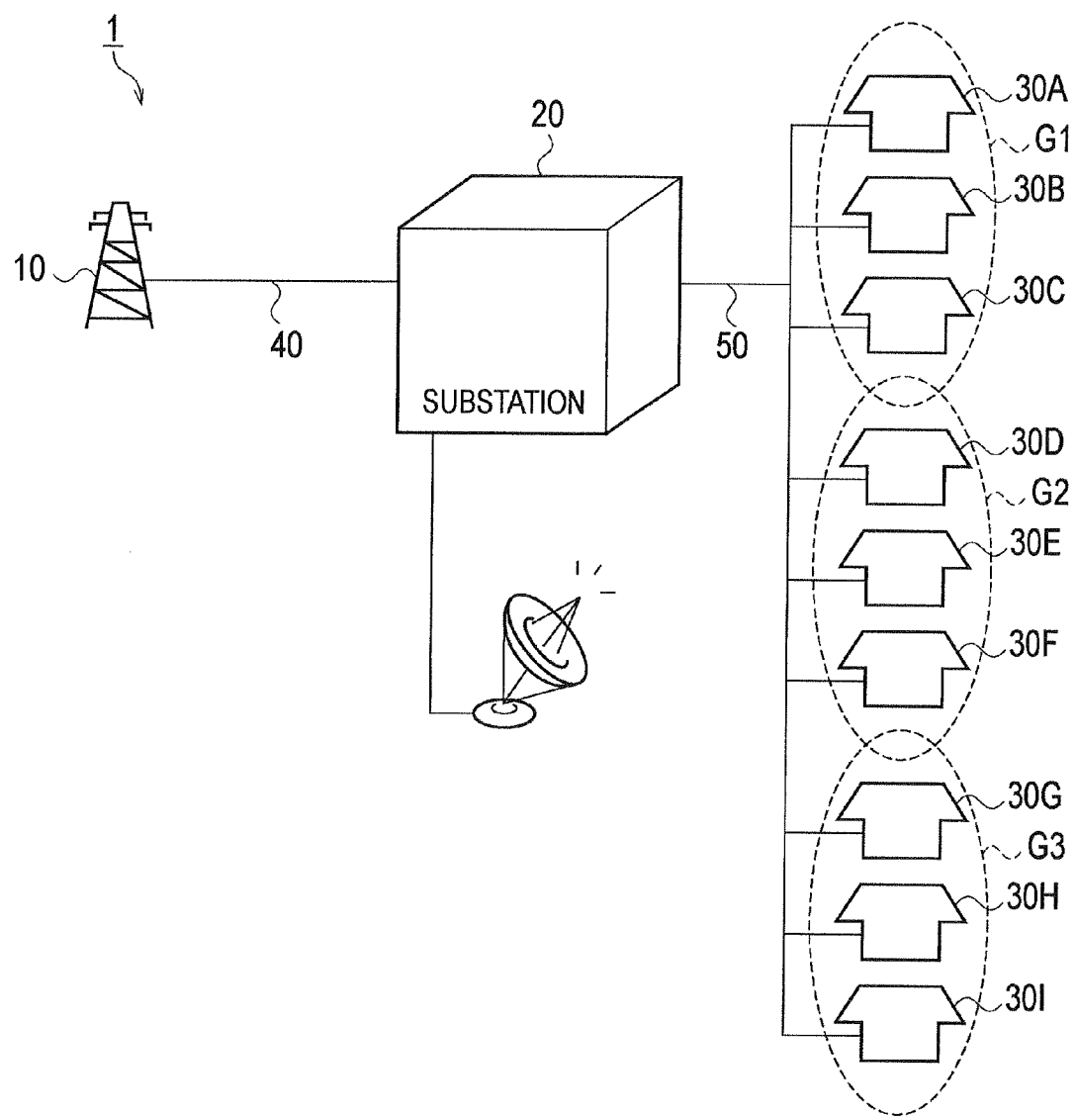
FIG. 1 is a schematic diagram showing a configuration of a power control system 1 according to a first embodiment.

Hereinafter, a power control system according to embodiments of the present invention will be described with reference to the drawings. Note that, in the descriptions of the drawings below, the same or similar portions are denoted by the same or similar reference numerals.

It should be noted, however, that the drawings are schematic, and that the dimensional proportions and the like are different from their actual values. Accordingly, specific dimensions and the like should be inferred based on the description given below. Moreover, obviously, dimensional relationships and proportions may differ from one drawing to another in some parts.

Generally, a flow of electric power from a power distribution system toward a customer is called a "forward flow," and electric power that flows, namely, electric power inputted from a power distribution system to a customer is called "forward flow power." In addition, a flow of electric power from a customer toward a power distribution system is called a "backward flow," and electric power that reversely flows, namely, electric power outputted from a customer to a power distribution system is called "backward flow power."

First Embodiment

Hereinafter, a first embodiment of the present invention will be described. In the first embodiment, descriptions will be given for the case where output power of a power supply device provided to a customer reaches a peak at noontime. In such a case, the voltage of the power distribution system might increase excessively, and hence the backward flow power in the daytime is desired to be reduced.

(Configuration of Power Control System)

Hereinafter, a configuration of the power control system according to the first embodiment will be described with reference to FIG. 1. FIG. 1 is a schematic diagram showing a configuration of a power control system 1 according to the first embodiment.

As shown in FIG. 1, the power control system 1 includes a high-voltage power source 10, a substation 20, and plural customers 30 (customers 30A to 30I).

The high-voltage power source 10 transmits high-voltage power to the substation 20 through a high-voltage power line 40. The high-voltage power source 10 is a power plant, for example.

The substation 20 distributes alternating current power generated by stepping down the high-voltage power, to the customers 30 through a power distribution system 50. The power distribution system 50 is a unit in which the substation 20 manages the customers 30. Note that the substation 20 may include plural power distribution systems 50 under its management. A configuration of the substation 20 will be described later.

Each of the customers 30 is electrically connected to the substation 20 through the power distribution system 50 to which the alternating current power is distributed. The customer 30 and the power distribution system 50 exchange electric power as necessary.

Here, the plural customers 30 are grouped into plural groups G (groups G1 to G3). In other words, each of the plural groups G includes at least one customer 30 (specifically, a power supply device 32 included in the customer 30).

More specifically, the group G1 is formed of three customers 30A to 30C located closest to the substation 20. The group G3 is formed of three customers 30G to 30I located farthest from the substation 20. The group G2 is formed of three customers 30D to 30F located between the groups G1 and G3.

In this embodiment, the plural customers 30 are allowed to provide backward flow power within such a range that the total amounts of backward flow power from the respective groups G to the power distribution system 50 are almost equal to each other. Therefore, the maximum amount of backward flow power that a group of the customers 30A to 30C is allowed to provide is substantially equal to the maximum backward flow power that each group of the customers 30D to 30F and the customers 30G to 30I is allowed to provide.

Note that the maximum backward flow power from each of the customers 30 can be identified in advance on the basis of a contract capacity to be described later, rated output power of the power supply device 32 to be described later, and a power storage capacity of a power storage device 33 to be described later.

(Configuration of Substation)

Figure 2:
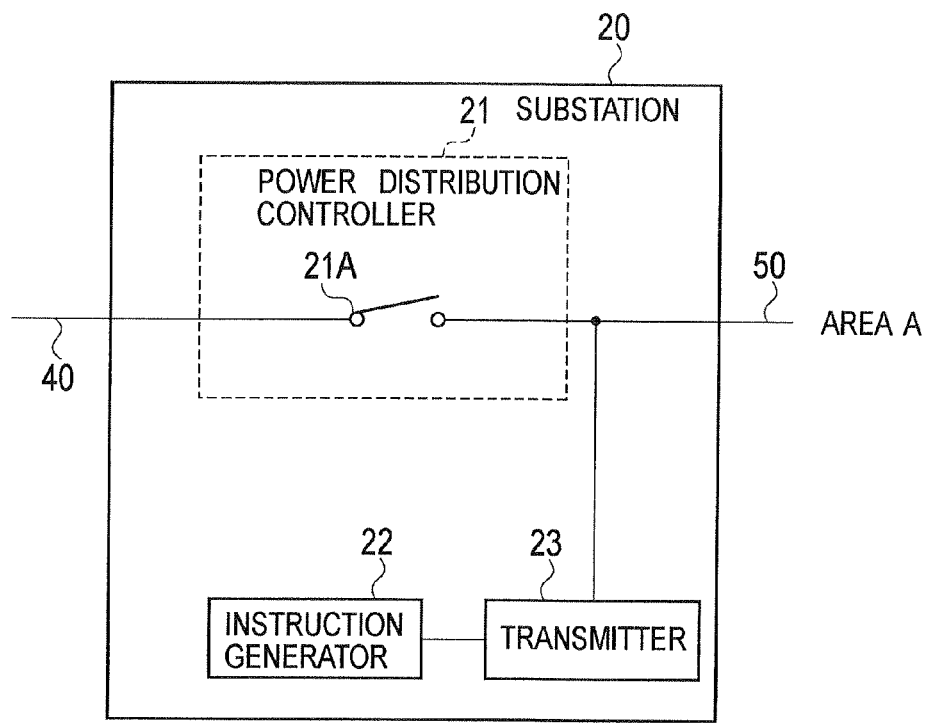
FIG. 2 is a block diagram showing a configuration of a substation 20 according to the first embodiment.

Hereinafter, a configuration of the substation according to the first embodiment will be described with reference to FIG. 2. FIG. 2 is a block diagram showing a configuration of the substation 20 according to the first embodiment.

As shown in FIG. 2, the substation 20 includes a power distribution controller 21, an instruction generator 22, and a transmitter 23.

The power distribution controller 21 includes a relay 21A. The relay 21A switches whether or not to distribute alternating current power, which a transformer (not shown) generates by stepping down the high-voltage power, to the power distribution system 50.

The instruction generator 22 generates an adjustment instruction that is an instruction to adjust the backward flow power from each customer 30. In this embodiment, the "adjustment instruction" includes at least one of "backward flow approval" allowing the customer 30 to increase and decrease the backward flow power at its own discretion, "backward flow disapproval" instructing the customer 30 to stop the backward flow power, and "discharge instruction" instructing the customer 30 to discharge electric power from the power storage device 33. As described above, this embodiment is intended to reduce the backward flow power to prevent an excessive increase of the voltage of the power distribution system 50.

In addition, the instruction generator 22 includes group information into the adjustment instruction, the group information indicating an application group Gp to which the adjustment instruction is applied. Accordingly, the adjustment instruction can be applied only to the customers 30 included in the application group Gp. Therefore, in this embodiment, the instruction generator 22 can generate adjustment instructions having different contents for the groups G1 to G3, respectively. A cycle of generating (transmitting) the adjustment instructions having different contents will be described later.

Moreover, the instruction generator 22 incorporates time information into the adjustment instruction, the time information indicating a time period in which the adjustment instruction is applied. Instead of using the time information, the instruction generator 22 may generate new adjustment instructions periodically (every hour, for example).

Further, the instruction generator 22 incorporates backward flow power information indicating the backward flow power into the adjustment instruction. Accordingly, the backward flow power can be efficiently reduced. Here, the backward flow power information can be determined on the basis of the following four methods.

(1) First Method

Figure 3:
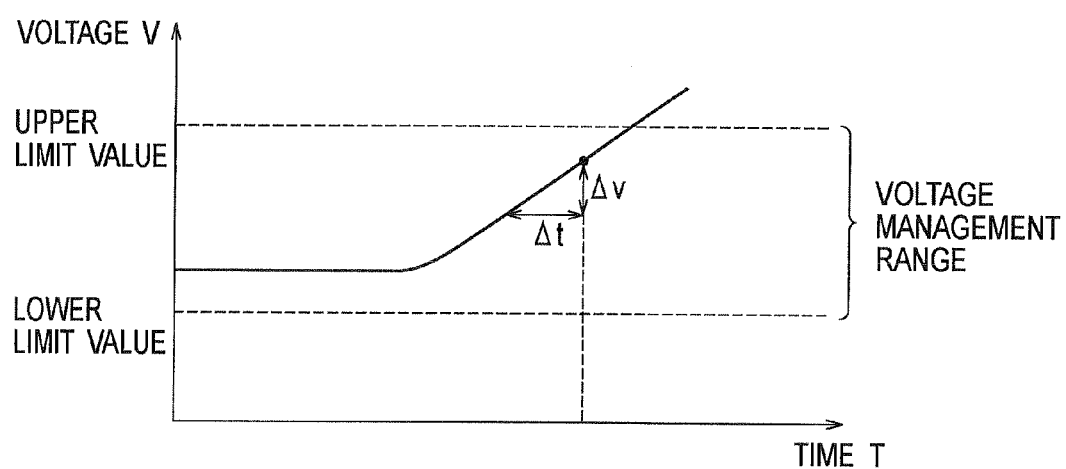
FIG. 3 is a diagram for explaining a method for calculating backward flow power information included in backward flow information according to the first embodiment.

A first method is a method of calculating how much amount of backward flow power from each customer 30 should be reduced to prevent the voltage of the power distribution system 50 from exceeding the upper limit of a voltage management range, on the basis of a voltage rise tendency (voltage rise range Δv/time duration Δt) in the power distribution system 50 as shown in FIG. 3, the contract capacity, the rated output power of the power supply device 32, and the power storage capacity of the power storage device 33.

When the customer 30 introduces a power consumption device 31, the power supply device 32, and the power storage device 33 (at the time of power-receiving contract), the contract capacity is determined and companies which provide and manage the power distribution system 50 such as a power company (an owner and operator of the power grid, and an operation manager of the power transmission and distribution system) are notified of the rated output power of the power supply device 32, the power storage capacity of the power storage device 33, and the like. Note that, therefore, the substation 20 can obtain the information presented to the power company. The voltage V may be measured at each grid interconnection point at which a grid interconnection device of a customer 30 is connected to the power distribution system 50. In this case, an average value, a largest value, or a smallest value of measured voltage values at the grid interconnection point may be determined as the voltage V.

(2) Second Method

A second method is a method of calculating how much amount of backward flow power from the customer 30 should be obtained to resolve the shortage of power in consideration of weather conditions on the day (real-time data, forecast data, and the like), a season, time, calendar information, and the presence or absence of: an event such as a sportscast (an increase in power consumption by using power consumption devices such as an air conditioner and a television set in the customer 30 for watching of, a live broadcast of a soccer or basket ball game, a high school baseball game in midsummer and the like, an Olympic games broadcast, and the like); or an event in the power distribution system 50 (an increase in power consumption at a venue for a concert or the like and neighboring facilities).

(3) Third Method

A third method is a method of calculating how much amount of backward flow power from the customer 30 should be reduced to prevent the voltage of the power distribution system 50 from exceeding the upper limit of the voltage management range, on the basis of the amount of forward flow/backward flow calculated from, for example, the type and the rated output power of the power supply device 32 provided to each customer 30, in addition to the weather conditions on the day mentioned in the second method.

Here, the power supply device 32 is classified into several types. Examples of those types are: a type having rated output power with a certain value or higher, a public use type, an environment-friendly clean energy type such as a photovoltaic power generator and a wind turbine generator, and a reliable supply type such as a gas engine generator and a fuel cell power generator having no power variation caused by weather conditions and the like.

(4) Fourth Method

A fourth method is a method of calculating how much backward flow power from the customer 30 should be reduced to prevent the voltage of the power distribution system 50 from exceeding the upper limit of the voltage management range, on the basis of prediction information derived from a history of past power consumption and the like and the amount of forward flow/backward flow calculated from the type and the rated output power of the power supply device 32 provided to the customer 30, and the like.

The transmitter 23 transmits the adjustment instruction generated by the instruction generator 22 to each customer 30. Specifically, the transmitter 23 broadcasts the adjustment instruction to all the customers 30 through the power distribution system 50 (a power line communication and the like).

Instead, the transmitter 23 transmits the adjustment instruction to the customers 30 through a transmission path different from that of the power distribution system 50. For example, the transmitter 23 transmits the adjustment instruction and a priori adjustment instruction to all the customers 30 by using a data distribution segment provided separately from a content distribution segment in the terrestrial digital broadcasting.

(Configuration of Customer)

Figure 4:
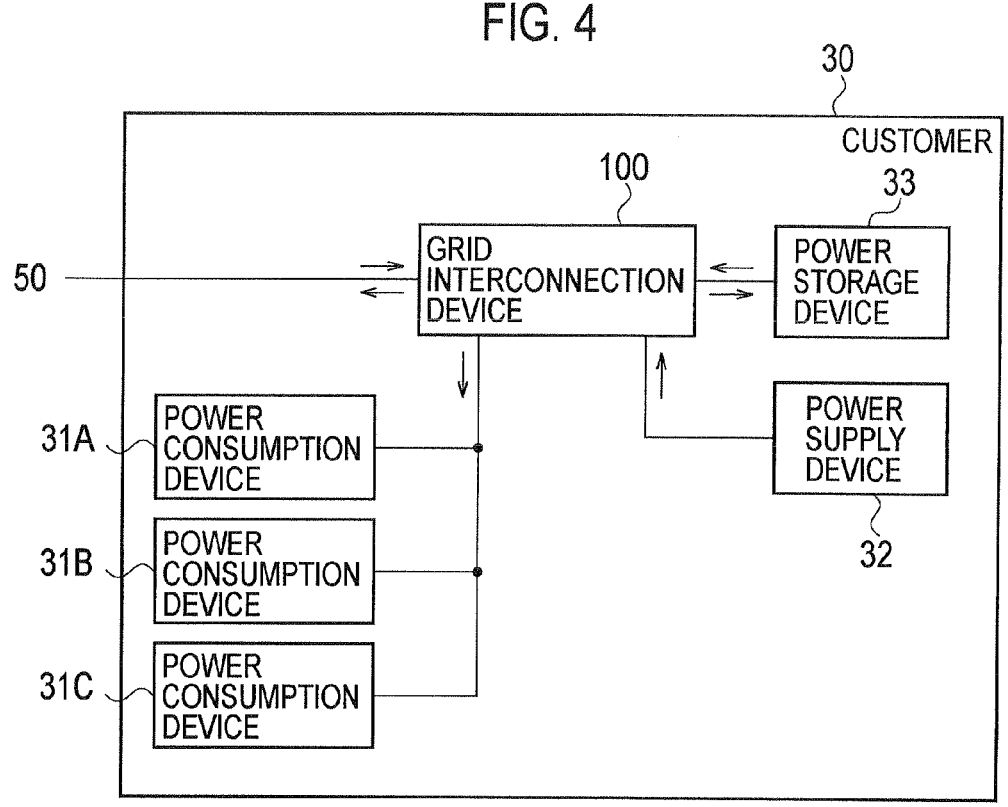
FIG. 4 is a block diagram showing a configuration of a customer 30 according to the first embodiment.

Hereinafter, a configuration of the customer according to this embodiment will be described with reference to FIG. 4. FIG. 4 is a block diagram showing a configuration of the customer 30 according to this embodiment. Note that the arrows in FIG. 4 indicate directions of inputs and outputs of electric power.

As shown in FIG. 4, the customer 30 includes plural power consumption devices 31 (power consumption devices 31A to 31C), the power supply device 32, the power storage device 33, and a grid interconnection device 100.

The power consumption devices 31 operate by consuming forward flow power transmitted from the power distribution system 50, output power outputted by the power supply device 32, or electric power stored in the power storage device 33. The power consumption devices 31 are household electric appliances, for example.

Examples of the power supply device 32 are a photovoltaic power generator, a wind turbine generator, a fuel cell power generator, and a gas engine generator. The power supply device 32 may be a secondary battery, an electric double-layer capacitor, or the like.

The power storage device 33 stores the output power outputted by the power supply device 32 and the forward flow power w from the power distribution system 50. The power storage device 33 may be a secondary battery such as a lithium ion battery and a nickel hydride battery, an electric double-layer capacitor, or the like.

The grid interconnection device 100 controls interconnections among the power distribution system 50, the plural power consumption devices 31, the power supply device 32, and the power storage device 33. For example, when the grid interconnection device 100 controls the interconnection between the power distribution system 50 and the power storage device 33, the grid interconnection device 100 controls the backward flow power from the power storage device 33 to the power distribution system 50. A configuration of the grid interconnection device 100 will be described below.

(Configuration of Grid Interconnection Device)

Figure 5:
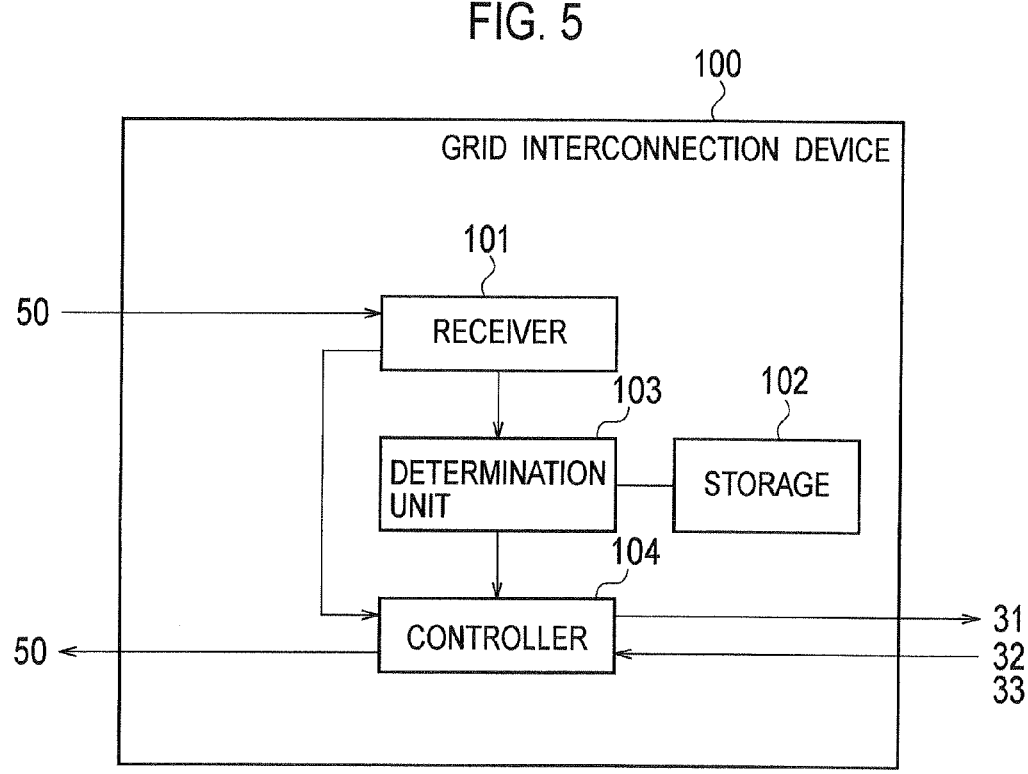
FIG. 5 is a block diagram showing a configuration of a grid interconnection device 100 according to the first embodiment.
Figure 6A:
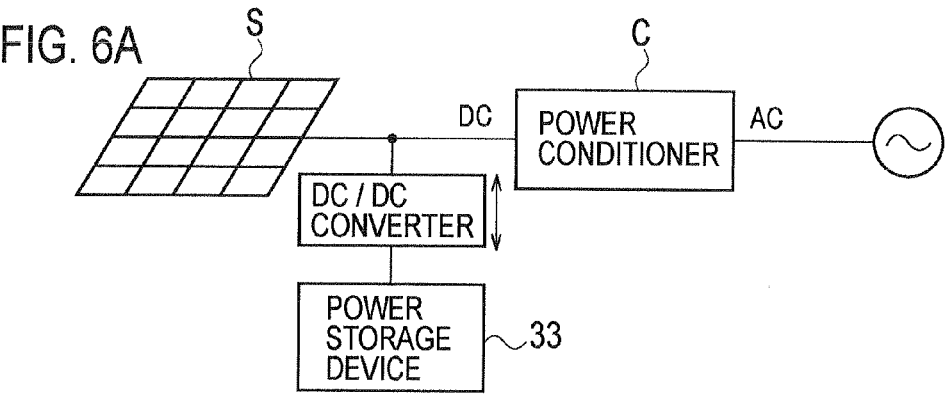
FIGS. 6A to 6D are diagrams for explaining schemes for connecting a power storage device 33 according to the first embodiment.
Figure 6B:
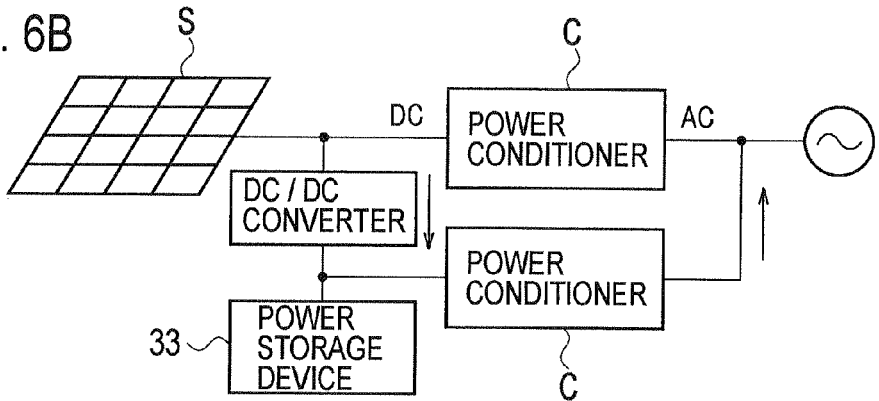
Figure 6C:
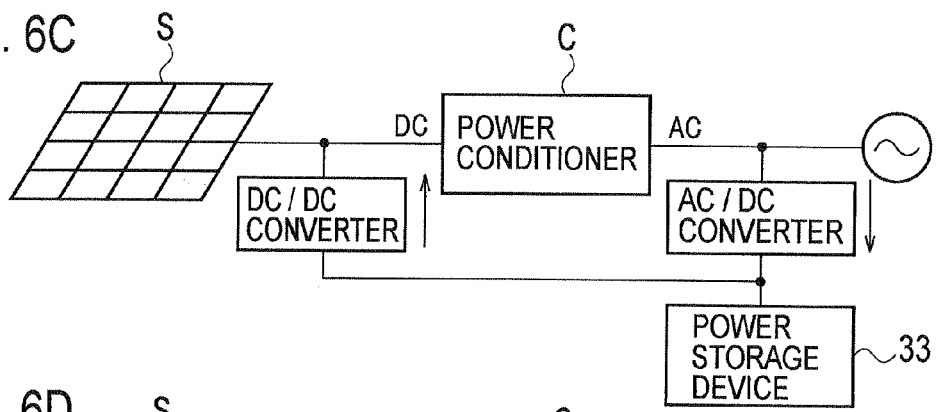
Figure 6D:
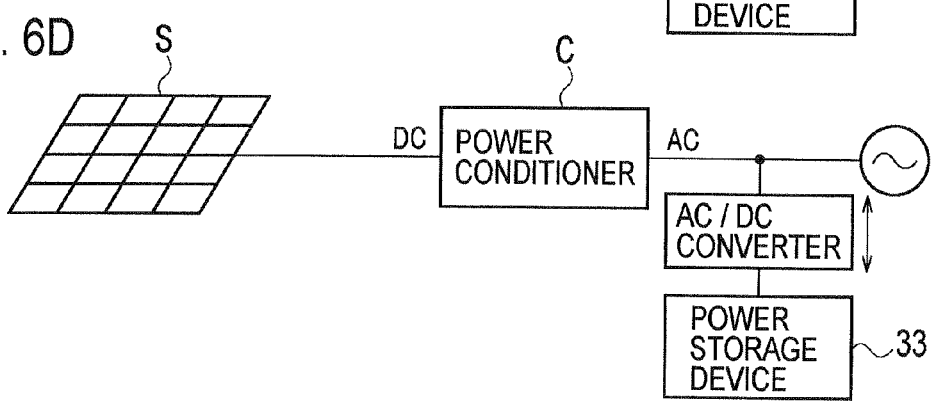

Hereinafter, a configuration of the grid interconnection device according to this embodiment will be described with reference to FIG. 5. FIG. 5 is a block diagram showing a configuration of the grid interconnection device 100 according to this embodiment.

As shown in FIG. 5, the grid interconnection device 100 includes a receiver 101, a storage 102, a determination unit 103, and a controller 104. The receiver 101 receives the aforementioned adjustment instruction through the power distribution system 50 (a power line communication and the like) or the terrestrial digital broadcasting.

The storage 102 stores own group information that specifies an own group to which its customer 30 belongs. In addition, the storage 102 stores the contract capacity, the rated output power to and the type of the power supply device 32, the power storage capacity of the power storage device 33, and the like.

The determination unit 103 determines whether or not the own group is the application group Gp on the basis of the group information included in the adjustment instruction received by the receiver 101.

If the determination unit 103 determines that the own group is the application group Gp, the controller 104 controls the backward flow power on the basis of the adjustment instruction. Specifically, when the adjustment instruction indicates the "backward flow approval," the controller 104 calculates the amount of backward flow power on the basis of the consumed power of the power consumption devices 31, the output power of the power supply device 32, the power storage capacity of the power storage device 33, and the like. In this case, the amount of backward flow power may be not smaller than zero or may be smaller than zero. When the backward flow power is smaller than zero, the forward flow power is larger than zero.

When the adjustment instruction indicates the "backward flow disapproval," the controller 104 adjusts the backward flow power from the power supply device 32 and the power storage device 33 to zero or below. In this case, the power storage device 33 is allowed to be charged from the power distribution system 50.

When the adjustment instruction indicates the "discharge instruction," the controller 104 discharges the electric power stored in the power storage device 33. In this case, the electric power of the power storage device 33 is supplied to each power consumption device 31 in principle. However, when the adjustment instruction includes the "backward flow approval" along with "discharge instruction," the controller 104 can cause the electric power to flow reversely from the power storage device 33 to the power distribution system 50.

In contrast, if the determination unit 103 determines that the own group is not the application group Gp, the controller 104 discards the adjustment instruction.

Now, a control of the controller 104 will be described by taking an example of the adjustment instruction transmitted from the substation 20 to each group G. The table below shows an example of what are instructed by the adjustment instructions. In the table below, the adjustment instructions include the backward flow approval A, the backward flow disapproval B, and the discharge instruction C.

TABLE 1

| TIME | 0-7 | 8-9 | 9-10 | 10-11 | 11-12 | 12-13 | 13-14 | 14-15 | 15-16 | 16-24 |
|---|---|---|---|---|---|---|---|---|---|---|
| G1 | C | C + A | A | B | A | B | B | A | B | C |
| G2 | C | C + A | B | A | B | B | A | B | A | C |
| G3 | C | C + A | A | B | A | B | B | A | B | C |

As shown in the table above, the backward flow disapproval B is transmitted to the groups G1 to G3 at noontime (from 12 to 13 o'clock) when the output power of the power supply device 32 reaches a peak.

On the other hand, in the morning (from 9 to 12 o'clock) and in the afternoon (from 13 to 16 o'clock), the backward flow approval A and the backward flow disapproval B are rotated so that the groups G1 and G3 can have a rotation opposite to the group G2. Specifically, a time period when the groups G1 and G3 are allowed to provide the backward flow and a time period when the group G2 is allowed to provide the backward flow are alternately set in the morning (from 9 to 12 o'clock) and in the afternoon (from 13 to 16 o'clock).

Here, when the power reversely flows from each of the groups G to the power distribution system 50, the voltage in the power distribution system 50 tends to increase according to an increase in a distance from the substation 20. For this reason, the voltage in the power distribution system 50 exceeds the upper limit of the voltage management range more frequently at a location farther from the substation 20. In other words, as the position of the group G is farther from the substation 20, the group G has less opportunity for the backward flow.

Accordingly, in this embodiment, a time period when the group G2 is allowed to provide the backward flow is set after a time period when the group G3, which is located farther from the substation than the group G2 is, is allowed to provide the backward flow, as described above. Similarly, a time period when the group G1 is allowed to provide the backward flow is set after a time period when the group G2, which is located farther from the substation than the group G1 is, is allowed to provide the backward flow.

As a result of the above setting, the groups G transmit the backward flow power to the substation 20 smoothly in turn, and are given equal opportunity for the backward flow.

In addition, in this embodiment, the discharge instruction C is transmitted to the groups G1 to G3 from the early evening to the morning (16 to 8 o'clock) in order to prepare for the backward flow disapproval B at noontime. Here, the power storage device 33 can be discharged by using the backward flow from 8 to 9 o'clock.

Upon receipt of the backward flow approval A, the controller 104 can provide a backward flow of the output power of the power supply device 32 if the output power is larger than the consumed power of the power consumption devices 31. In this case, if the power storage device 33 is charged, the controller 104 can also provide a backward flow of the electric power stored in the power storage device 33.

In addition, upon receipt of the backward flow disapproval B, the controller 104 supplies the output power of the power supply device 32 to the power consumption devices 31 and the power storage device 33. In other words, in this case, the controller 104 stops the backward flow power. Note that, along with this supply from the power supply device 32, the controller 104 can also freely supply the forward flow power to the power consumption device 31 and the power storage device 33. In particular, there is a case where the adjustment instruction includes not only the backward flow disapproval B but also a forward flow receive request (not shown in Table 1) to receive an increased amount of forward flow power. In this case, the controller 104 increases the amount of forward flow power from the power distribution system 50 to the power consumption device 31 and the power storage device 33.

Upon receipt of the backward flow approval A in the next time period after receiving the adjustment instruction including the backward flow disapproval B and the forward flow receive request, the grid interconnection device 100 may preferentially provide a backward flow from the power storage device 33 in order to increase the available storage capacity of the power storage device 33 in preparation for a case where "the B+forward flow receive request" are received in the subsequent next time period. Alternatively, the substation 20 may transmit the discharge instruction C along with the backward flow approval A in the next time period after transmitting the adjustment instruction including the backward flow disapproval B and the forward flow receive request. In this case, the grid interconnection device 100 provides the backward flow from the power storage device 33 in accordance with the discharge instruction C.

Figure 7:
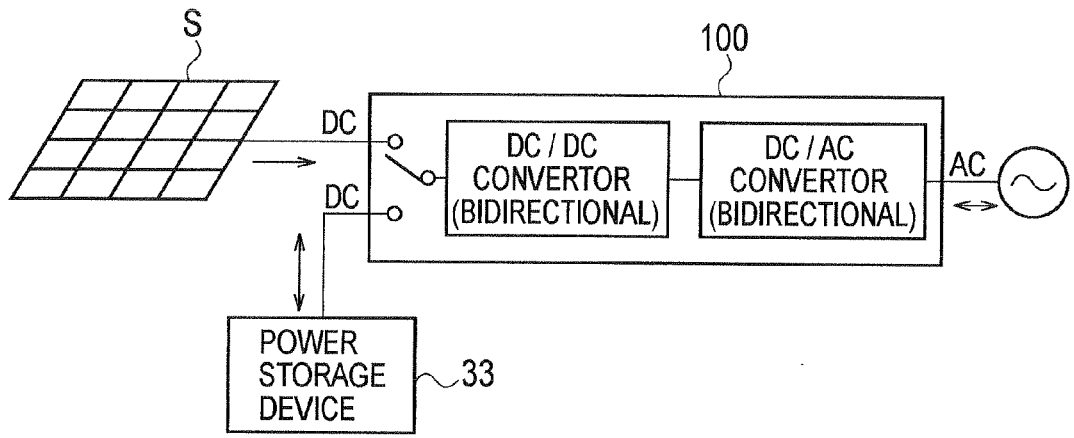
FIG. 7 is a diagram for explaining a scheme for connecting the power storage device 33 according to the first embodiment.

In addition, the controller 104 controls the output power of the power supply device 32 so that the output power can synchronize with the alternating current power of the power distribution system 50. Specifically, when the power supply device 32 is a direct current power supply (a photovoltaic power generator, for example), the controller 104 steps up direct current power outputted by the power supply device 32 by using a boost circuit and then converts the resultant direct current power into predetermined alternating current power for the purpose of synchronization with the alternating current power of the power distribution system 50. Here, FIGS. 6A to 6D are diagrams for illustrating schemes for connecting the power storage device 33 to a photovoltaic module S and a power conditioner C that are already present in the customer 30. Note that, in FIGS. 6A to 6D, the power storage devices 33 have input and output sources different from each other in terms of direct current and alternating current. FIG. 7 is a diagram for illustrating a scheme for newly installing the photovoltaic module S, the power conditioner C, and the power storage device 33. In the scheme shown in FIG. 7, the grid interconnection device 100 having a bidirectional DC/DC converting unit and a bidirectional DC/AC converting unit in place of the power conditioner C and the converters shown in FIGS. 6A to 6D.

In contrast, when the power supply device 32 is an alternating current power supply (a wind turbine generator, for example), the controller 104 converts the alternating current power outputted by the power supply device 32 into direct current power by using a rectifier circuit and then converts the resultant direct current power into predetermined alternating current power by using an inverter circuit for the purpose of synchronization with the alternating current power of the power distribution system 50. Alternately, the controller 104 converts the alternating current power outputted by the power supply device 32 into predetermined alternating current power by using a matrix converter circuit, a cycloconverter circuit, or the like.

(Operation of Grid Interconnection Device)

Figure 8:
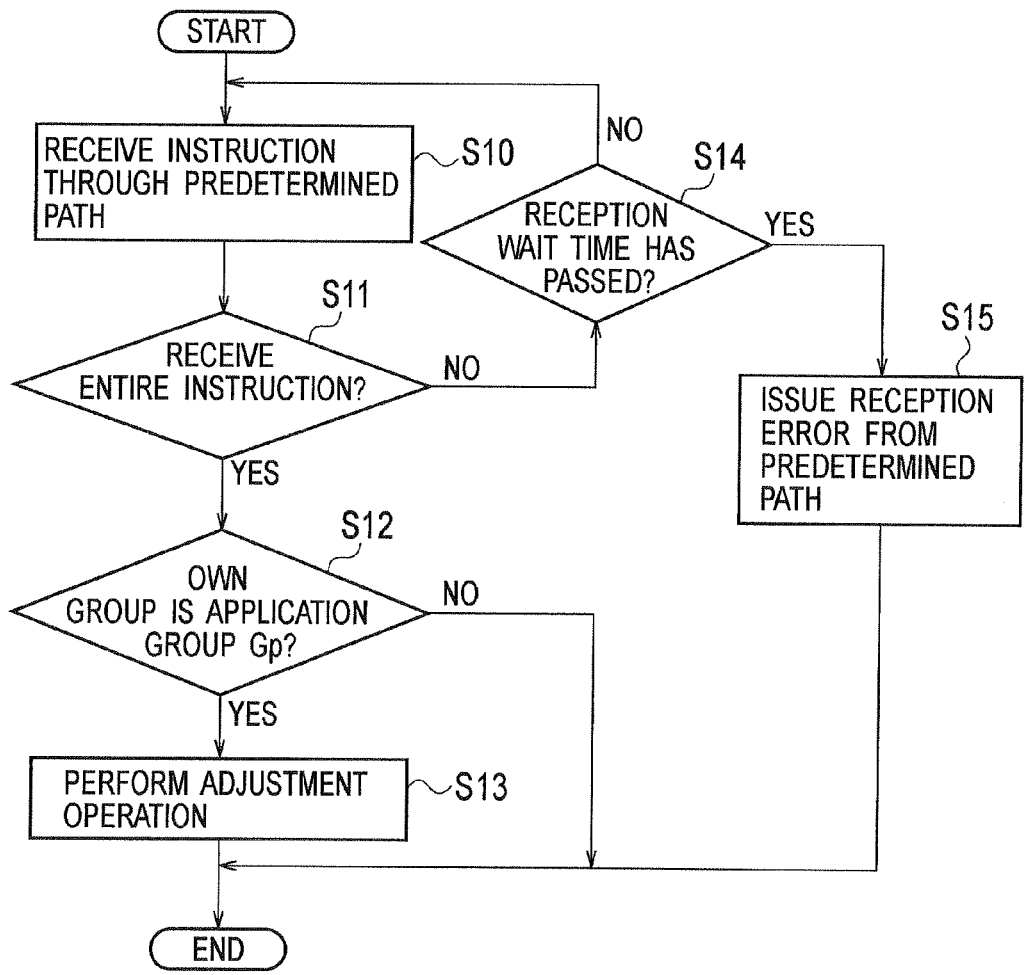
FIG. 8 is a flowchart showing determination processing of the grid interconnection device 100 according to the first embodiment.

Hereinafter, an operation of the grid interconnection device according to this embodiment will be described with reference to FIG. 8. FIG. 8 is a flowchart showing determination processing of the grid interconnection device 100 according to this embodiment.

As shown in FIG. 8, in step S10, the grid interconnection device 100 receives the adjustment instruction through a predetermined path.

In step S11, the grid interconnection device 100 determines whether or not the entire adjustment instruction is received through the predetermined path. If the entire adjustment instruction is received, the processing moves to step S12. If the entire adjustment instruction is not received, the processing moves to step S14.

In step S12, the grid interconnection device 100 determines whether or not the own group is designated as the application group indicated by the group information. If the own group is designated as the application group, the processing moves to step S13. If the own group is not designated as the application group, the processing terminates.

In step S13, the grid interconnection device 100 controls the backward flow power on the basis of the instruction.

In step S14, the grid interconnection device 100 determines whether or not a predetermined reception wait time has passed or not. If the reception wait time has passed, the processing moves to step S15. If the reception wait time has not passed, the processing returns to step S10

In step S15, the grid interconnection device 100 issues a reception error indicating a failure to receive the adjustment instruction through the predetermined path. A user may be notified of the reception error by a warning sign or an alarm, for example.

Figure 9:
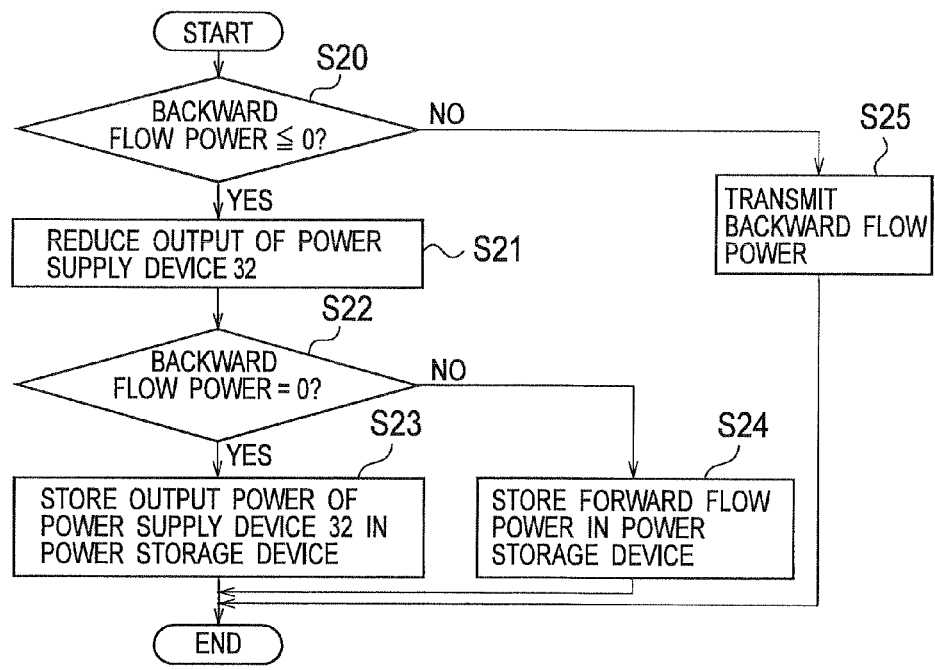
FIG. 9 is a flowchart showing processing of controlling backward flow power by the grid interconnection device 100 according to this embodiment.

FIG. 9 is a flowchart showing processing of controlling the backward flow power by the grid interconnection device 100 according to this embodiment.

As shown in FIG. 9, in step S20, the grid interconnection device 100 determines if the backward flow power is zero or smaller, by referring to the backward flow power information or forward flow power information included in the adjustment instruction. If the backward flow power is zero (backward flow disapproval) or smaller than zero (forward flow receive request), the processing moves to step S21. If the backward flow power is larger than zero (backward flow approval), the backward flow power is transmitted in step S25 and the processing terminates.

In step S21, the grid interconnection device 100 reduces the output power of the power supply device 32 in order to prevent the available storage capacity of the power storage device 33 from being zero.

In step S22, the grid interconnection device 100 determines if the backward flow power is zero. If the backward flow power is zero, the processing moves to step S23. If the backward flow power is not zero, in other words, if the forward flow power is larger than zero, the processing moves to step S24.

In step S23, the grid interconnection device 100 stores the output power of the power supply device 32 in the power storage device 33. Accordingly, the backward flow power is controlled.

In step S24, the grid interconnection device 100 stores the output power of the power supply device 32 and the forward flow power from the power distribution system 50 in the power storage device 33.

Figure 10:
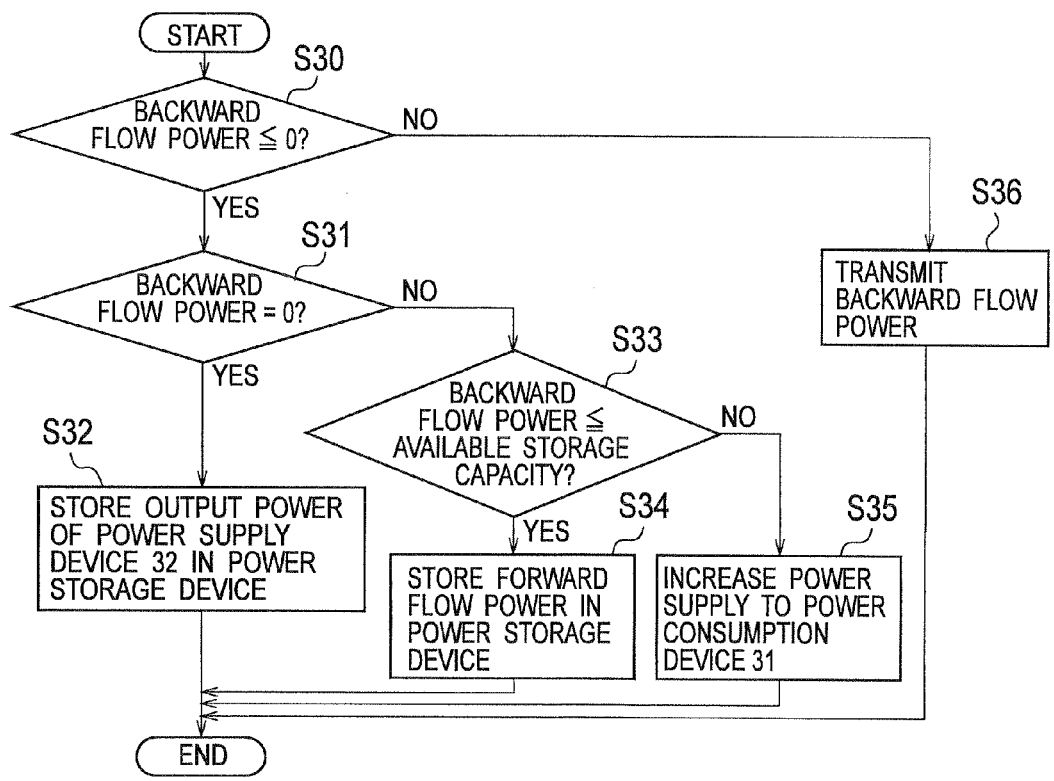
FIG. 10 is a flowchart showing processing of controlling the backward flow power by the grid interconnection device 100 according to this embodiment.

FIG. 10 is a flowchart showing another type of processing of controlling the backward flow power by the grid interconnection device 100. A different point from the from the aforementioned processing in FIG. 9 is that the processing in FIG. 10 includes the step of determining if the available storage capacity is equal to or larger than the forward flow power.

As shown in FIG. 10, in step S30, the grid interconnection device 100 determines if the backward flow power is zero or smaller, by referring to the backward flow power information or the forward flow power information included in the adjustment instruction. If the backward flow power is zero or smaller, this indicates the backward flow disapproval or the forward flow receive request, and accordingly the processing moves to step S31. If the backward flow power is larger than zero, this indicates the backward flow approval. Accordingly, the backward flow power is transmitted in step S36 and the processing terminates.

In step S31, the grid interconnection device 100 determines if the backward flow power is zero. If the backward flow power is zero, the processing moves to step S32. If the backward flow power is not zero, in other words, if the forward flow power is larger than zero, the processing moves to step S33.

In step S32, the grid interconnection device 100 stores the output power of the power supply device 32 in the power storage device 33.

In step S33, the grid interconnection device 100 determines if the available storage capacity of the power storage device 33 is equal to or larger than the forward flow power. If the available storage capacity of the power storage device 33 is equal to or larger than the forward flow power, the processing moves to step S34. If the available storage capacity of the power storage device 33 is smaller than the forward flow power, the processing moves to step S35.

In step S34, the grid interconnection device 100 stores the forward flow power from the power distribution system 50 in the power storage device 33 in accordance with the forward flow power information.

In step S35, the grid interconnection device 100 increases power supplied to the power consumption device 31. As mentioned above, the grid interconnection device 100 reduces the backward flow power and increases the forward flow power to prevent a voltage rise at the grid interconnection point at which the grid interconnection device 100 is interconnected to the power distribution system 50.

Advantageous Effects

In the grid interconnection device 100 according to this embodiment, the adjustment instruction includes the group information indicating the application group Gp to which the adjustment instruction is applied among the plural groups G. The plural customers 30 (including the power supply device 32) are grouped according to the distance from the substation.

Therefore, the backward flow power is controlled group G by group G. For this reason, opportunity for the backward flow is equally given to the group G1 near the substation, the group G3 far from the substation, and the group G2 between the groups G1 and G3. As a result, the plural customers 30 are equally allowed to provide backward flow power.

To be more precise, for example, a cycle is rotated in which: while the backward flow approval is issued to a particular one of groups G, the backward flow disapproval is issued to the other two groups G; while the backward flow disapproval is issued to the particular group G, the backward flow approval is issued to the other two groups G. Thereby, the opportunity for the backward flow is equally given to the plural groups G.

In addition, the power storage device 33 is discharged in accordance with the discharge instruction C in preparation for the backward flow disapproval B. This prevents occurrence of a situation in which the customer 30 cannot store power in response to the backward flow disapproval B due to the lack of the available storage capacity of the power storage device 33.

Moreover, the adjustment instruction may include the forward flow receive request along with the backward flow disapproval. This causes the power storage device 33 to store the forward flow power therein, and thereby a voltage rise of the power distribution system 50 can be effectively suppressed.

Modification of First Embodiment

A modification of the first embodiment will be described below with reference to the drawing. Hereinafter, the description will be given mainly for the difference between this modification and the first embodiment. This modification intends to equalize the amounts of backward flow power among the groups G.

Figure 11:
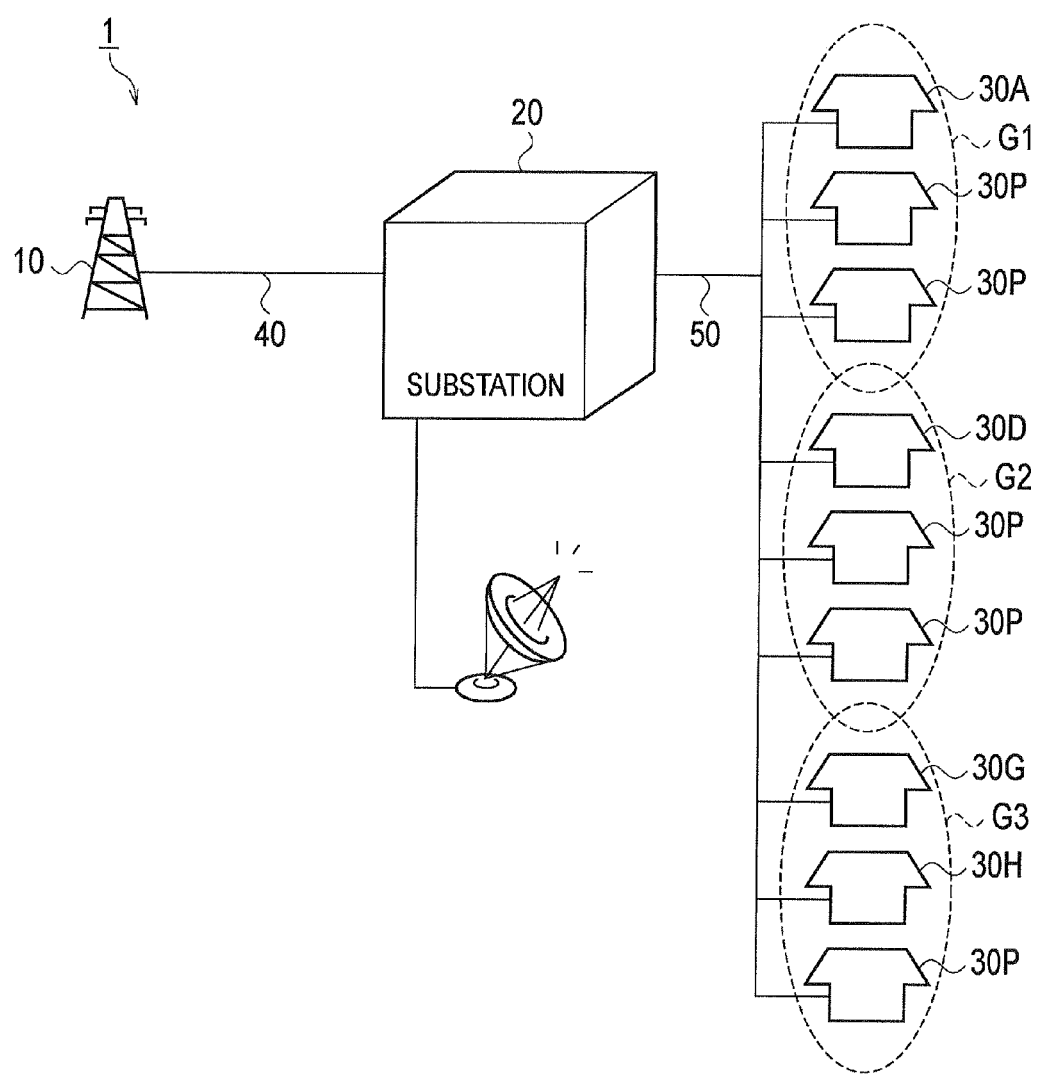
FIG. 11 is a schematic diagram showing a configuration of a power control system 1 according to a modification of the first embodiment.

As shown in FIG. 11, each of the plural groups G includes at least one high-capacity customer 30P. The high-capacity customer 30P is a customer capable of receiving the backward flow power from another customer 30. Specifically, the high-capacity customer 30P is a customer provided with a power storage device (a secondary battery, an electric double-layer capacitor, or the like) as the power supply device 32, or a customer provided with the power storage device 33 having a power storage capacity larger than a predetermined power storage capacity (for example, the maximum amount of backward flow power (the rated output power of the power supply device 32)).

In this modification, as shown in FIG. 11, each of the groups G1 and G2 includes two high-capacity customers 30P, and the group G3 includes one high-capacity customer 30P. The sum $C1_{all}$ of the power storage capacities of the customers 30 included in the group G1 is approximately equal to the sum $C2_{all}$ of the power storage capacities of the customers 30 included in the group G2. The sum $C3_{all}$ of the power storage capacities of the customers 30 included in the group G3 is smaller than any of the sum $C1_{all}$ and the sum $C2_{all}$. Therefore, the following expression is established.

[Formula 1]

$$\text{SUM } C3_{all} < \text{SUM } C1_{all} \approx \text{SUM } C2_{all} \quad (1)$$

As described above, in this embodiment, the groups G1 and G2 having a larger sum of the power storage capacities are located at positions closer to the substation 20 than the group G3 having a smaller sum of the power storage capacities is located.

Here, the voltage of the power distribution system 50 tends to be higher as a distance from the substation 20 increases. Accordingly, the voltage of the power distribution system 50 more frequently exceeds the upper limit of the voltage management range as the distance from the substation 20 increases.

Therefore, when the group G3 positioned farther from the is substation 20 is allowed to provide the backward flow power, the groups G1 and G2 positioned closer to the substation 20 are caused to receive the forward flow power, which, in turn, prevents the backward flow from the group G3 from being interrupted.

Particularly, when the groups G1 and G2 located closer to the substation 20, and having the larger sum of power storage capacities are caused to receive the forward flow power as in this modification, the group G3 is allowed to provide the backward flow power under favorable conditions.

In addition, the groups G1 and G2 having the larger sum of power storage capacities provide the backward flow power more easily than the group G3 having the smaller sum of power storage capacities. In other words, the amount of backward flow power per unit hour from each of the groups G1 and G2 is larger than the amount of backward flow power per unit hour from the group G3. For this reason, it is preferable to set the group G3 to have more time periods when the backward flow is allowed than the groups G1 and G2.

Next, an example of the adjustment instruction transmitted from the substation to the group G will be described. In this modification, the adjustment instruction includes not only the "backward flow disapproval" but also the "forward flow receive request" to receive an increased amount of forward flow power. In response to the adjustment instruction including the "backward flow disapproval" but also the "forward flow receive request," the controller 104 increases the forward flow power from the power distribution system 50 to the power consumption device 31 and the power storage device 33. The adjustment instruction may include the forward flow power information indicating the forward flow power.

Note that, in the table below, the adjustment instruction is any one or any combination of the backward flow approval A, the backward flow disapproval B, the discharge instruction C, and a forward flow receive request D.

TABLE 2

| TIME | 0-7 | 8-9 | 9-10 | 10-11 | 11-12 | 12-13 | 13-14 | 14-15 | 15-16 | 16-24 |
|---|---|---|---|---|---|---|---|---|---|---|
| G1 | C | C + A | B + D | B + D | A | B + D | A | B + D | B + D | C |
| G2 | C | C + A | B + D | A | B + D | B + D | B + D | A | B + D | C |
| G3 | C | C + A | A | A | B + D | B + D | B + D | A | A | C |

As shown in the table above, in the morning (from 9 to 12 o'clock) and in the afternoon (from 13 to 16 o'clock), the backward flow approval A and the backward flow disapproval B are rotated so that the groups G1 and G2 can have a different rotation from the group G3. Specifically, in the morning (from 9 to 12 o'clock) and in the afternoon (from 13 to 16 o'clock), the groups G1 and G2 receive the backward flow approval A twice and the backward flow disapproval B four times, and the group G3 receives the backward flow approval A four times and the backward flow disapproval B twice.

As described above, the group G3 having the smaller sum C of power storage capacities is set to have a longer time period when the backward flow is allowed. When the group G3 positioned farther from the substation 20 is allowed to provide the backward flow, the groups G1 and G2 positioned closer to the substation 20 are caused to receive the distributed flow.

Advantageous Effects

According to the modification of the first embodiment, each of the groups G includes at least one high-capacity customer 30P provided with a power storage device as the power supply device 32. Accordingly, when one of the groups G is allowed to provide the backward flow, the other groups G can receive the distributed flow.

In this embodiment, a time period when the backward flow is allowed is determined in accordance with the sum C of power storage capacities, and a group G having a smaller sum C is given a longer time period when the backward flow is allowed. Therefore, a group G capable of providing a smaller amount of backward flow power attributable to the smaller sum C of power storage capacities is allowed to provide the backward flow for a longer time.

In addition, in this modification, the groups G1 and G2 having the larger sum of power storage capacities are located at positions closer to the substation 20 than the group G3 having the smaller sum of power storage capacities. Therefore, when the group G3 positioned farther from the substation 20 is allowed to provide the backward flow, the groups G1 and G2 positioned closer to the substation 20 are caused to receive the distributed flow. Thereby, the group G3 is allowed to provide the backward flow smoothly.

Consequently, the plural groups G are allowed to equally provide the backward flow regardless of the distance from the substation 20.

Second Embodiment

Hereinafter, a second embodiment of the present invention will be described. In the second embodiment, a customer 30 includes a display unit configured to display information on a power control system 1.

Figure 12:
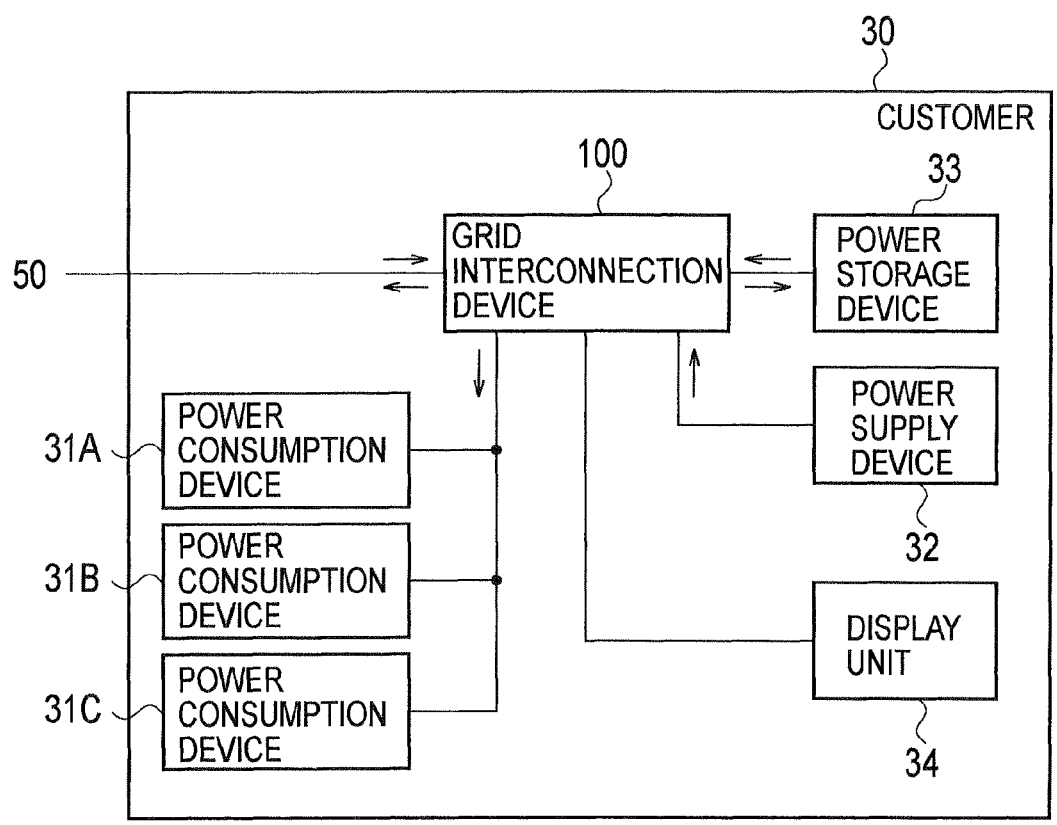
FIG. 12 is a block diagram showing a configuration of a customer 30 according to a second embodiment.

FIG. 12 is a block diagram showing a configuration of the customer 30 according to this embodiment. As shown in FIG. 12, the customer 30 includes a display unit 34. The display unit 34 is connected to a grid interconnection device 100. Incidentally, the display unit 34 may be provided in the grid interconnection device 100.

Display items of the display unit 34 are, for example, (1) the content of the present adjustment instruction, (2) the content of the next adjustment instruction, (3) information on backward flow power and forward flow power, (4) a remaining time until the next adjustment instruction, (5) statuses of electricity trading, (6) operation statuses of the power distribution system.

Figures 13A, 13B:
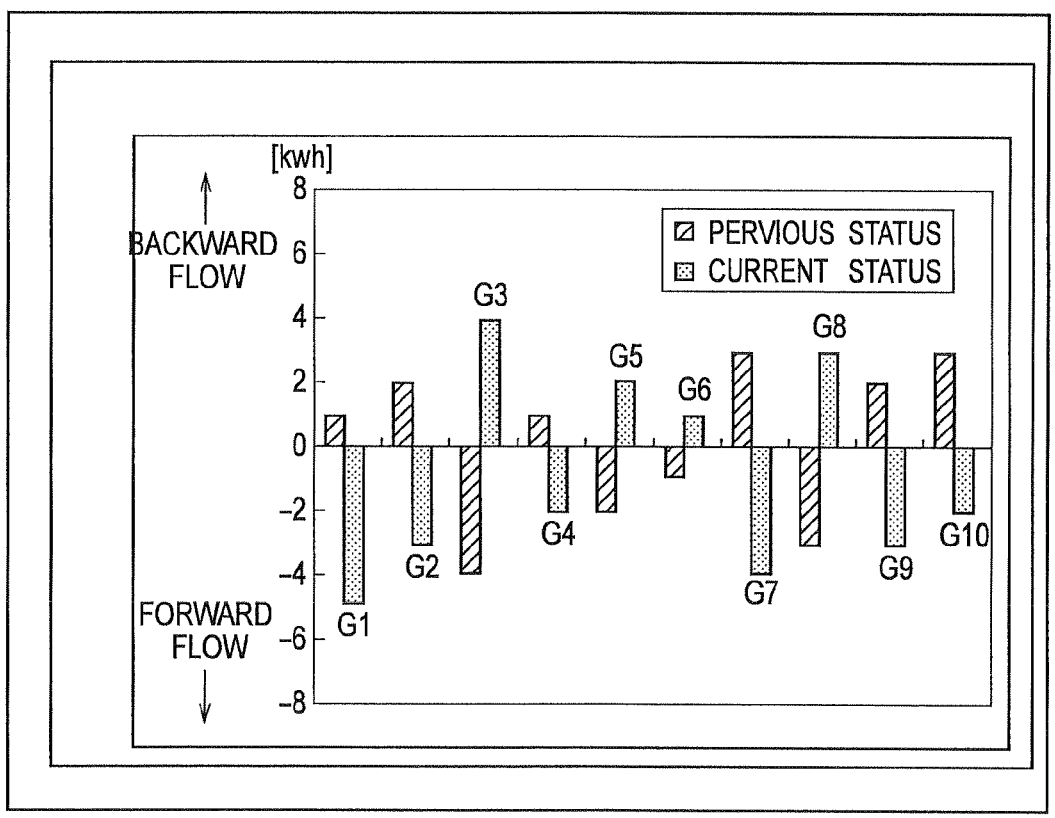
FIGS. 13A and 13B are diagrams showing display examples of a display unit 34 according to the second embodiment.

FIGS. 13A and 13B are diagrams showing display examples of the display unit 34. FIG. 13A is a display example showing the display items (1) to (5). FIG. 13B is a display example showing the display item (6). FIG. 13B shows histories of backward flow power and forward flow power of 10 groups G1 to G10 arranged in the power distribution system 50.

A user can check the operating conditions of his/her own customer by observing the display items (1) to (5) of the display unit 34.

In addition, a user can check if the groups G are given equal opportunity for the backward flow by observing the display item (6) of the display unit 34. In the example of FIG. 13B, the user can check that the group G4 is under the backward flow disapproval whereas the group G3 is under the backward flow approval in the current time period; and that the groups G4 is under the backward flow approval whereas the group G3 is under the backward flow disapproval in the previous time period. Accordingly, the users of the group G3 and the group G4 can observe that the backward flows are equally provided, and thereby can be made more convinced of the fairness in electricity trading.

Other Embodiments

The present invention has been described above using the embodiments of the present invention. It should be understood, however, that the descriptions and the drawings that constitute part of the disclosure do not limit the present invention. This disclosure will make various alternative embodiments, examples, and operation techniques apparent to those skilled in the art.

For example, the plural customers 30 are grouped into the plural groups depending on the distance from the substation 20; however, the invention is not limited to this configuration. The plural customers 30 may be grouped depending on the distance from any power distribution facility that distributes alternating current power to the power distribution system 50. Note that such a power distribution facility includes a step voltage regulator (SVR) and the like in addition to the substation 20. The power distribution facility includes a power distribution controller 21, an instruction generator 22, and a transmitter 23.

In addition, the instruction is transmitted to each customer 30 through the two transmission paths in the above-described embodiments; however, the invention is not limited to this configuration. Specifically, the instruction may be transmitted through only one transmission path or through three or more transmission paths.

In addition, the data distribution segment in the terrestrial digital broadcasting is described as an example of the predetermined path for transmitting the instruction in the above-described embodiments; however, the invention is not limited to this configuration. For example, the instruction may be transmitted through BS broadcasting, CS broadcasting, CATV, analog TV broadcasting, radio broadcasting, cable broadcasting, a paging system, a mobile telephone network, wireless communications conforming to 802.11x (wireless LAN), the internet, and the like. Moreover, the instruction may be transmitted by being added to information used for setting the time of a radio clock, or may be transmitted to the customers 30 through a network. If the network is used, the instruction may be updated on a server at fixed intervals.

Moreover, the instruction is transmitted from the substation 20 in the above-described embodiments; however, the invention is not limited to this configuration. Specifically, the instruction may be transmitted from another apparatus (a power company, a broadcasting station, or the like).

In addition, although not particularly mentioned in the above-described embodiments, the grid interconnection device 100 may display on a display device the instruction received, conditions of the devices (the output power, the available storage capacity, the forward flow power (purchased electricity), the backward flow power (sold electricity), the transition graphs of these, or the like) in addition to the display items of the display unit 34. A TV monitor, a PC monitor, and a mobile phone monitor are used as the display device. In addition, the grid interconnection device 100 may remove the code for hiding the instruction from the instruction added to network information received through TV reception waves, the internet, and the like. Moreover, the grid interconnection device 100 may have a function of receiving information from a television, a personal computer, and a mobile phone. In this case, an instruction to reduce power supplied to the power consumption devices 31 and the like can be sent from the television, the personal computer, and the mobile phone.

What is claimed is:

1. A grid interconnection device connected to a photovoltaic power generator and a power storage device, configured to convert direct current power outputted from the photovoltaic power generator and the power storage device into alternating current power synchronized with a distribution system, to supply the alternating current power to a power consumption device, and to provide reverse flow power to the distribution system, the grid interconnection device comprising:

a receiver configured to receive an adjustment instruction that is transmitted through a predetermined transmission path and that is an adjustment instruction to adjust the reverse flow power; and a controller configured to control the reverse flow power to the distribution system on the basis of the adjustment instruction, wherein the controller controls the reverse flow power based on an output power of the photovoltaic power generator and storage capacity of the power storage device, when receiving the adjustment instruction of reverse flow approval allowing a reverse flow, the controller controls the reverse flow power equal to zero, by supplying the output power of the photovoltaic power generator to the power storage device, or when the reverse flow is lower than zero supplying the output power of the photovoltaic power generator to the power storage device and supplying the forward flow power from the distribution system to the power storage device or the power consumption device, and the controller supplies the power stored in the power storage device to the power consumption device, when receiving the adjustment instruction of discharge instruction requesting a discharge of the power storage device.

2. The grid interconnection device according to claim 1, wherein the controller provides the reverse flow power from the power storage device to the distribution system, when the adjustment instruction includes the reverse flow approval as well as the discharge instruction.

3. The grid interconnection device according to claim 1, wherein the adjustment instruction includes time period information indicates a time period of applying the adjustment instructions.

4. The grid interconnection device according to claim 1, wherein the controller increases forward flow power from the distribution system to the power storage device, when receiving a forward flow request requesting an increment of an amount of the forward flow power from the distribution system.

* * * * *